United States Patent [19]

Angarola et al.

[11] 4,146,069
[45] Mar. 27, 1979

[54] APPARATUS FOR RAPIDLY INFLATING AND PRESSURIZING A DUNNAGE BAG

[75] Inventors: Barry R. Angarola, Schaumburg; A. L. Nocom, Des Plaines, both of Ill.

[73] Assignee: Signode Corporation, Glenview, Ill.

[21] Appl. No.: 820,162

[22] Filed: Jul. 29, 1977

[51] Int. Cl.² ............................................. B65B 1/18
[52] U.S. Cl. .................................... 141/68; 137/223; 141/349; 239/419.5; 417/179
[58] Field of Search ............... 137/223, 851, 852, 853; 141/10, 67, 68, 114, 285, 286, 301, 313–317, 324, 348, 349, 350, 367, 382, 387, 389, 392; 239/419.5, 425.5; 251/149.7; 417/179, 182; 46/90

[56] References Cited
U.S. PATENT DOCUMENTS

| | | | |
|---|---|---|---|
| 2,866,593 | 12/1958 | Bowman et al. | 417/179 X |
| 3,994,324 | 11/1976 | Zeyra | 141/349 |

Primary Examiner—Richard E. Aegerter
Assistant Examiner—Frederick R. Schmidt

Attorney, Agent, or Firm—Dressler, Goldsmith, Clement, Gordon & Shore, Ltd.

[57] ABSTRACT

A hollow housing is mounted in a wall of the dunnage bag and defines a chamber having an exterior opening in a portion of the housing on the exterior of the bag, and an interior opening in a portion of the housing communicating with the interior of the bag. A tube is provided for supplying pressurized gas or air adjacent the housing on the dunnage bag and has an alignment frame on one end for locating the tube relative to the housing and in alignment with the chamber in the housing. The alignment frame is substantially open to permit free flow of ambient air past exterior portions of the tube into the chamber. One or more orifices are located on a portion of the tube to allow discharge of jets of high pressure gas or air therethrough. The orifices are arranged and located in the tube with respect to the alignment frame so that they are spaced from the walls of the housing chamber when the tube is engaged with the housing, whereby, as the jets of pressurized gas are discharged into the chamber, ambient air is aspirated from between the orifices and the chamber through the chamber into the dunnage bag.

12 Claims, 19 Drawing Figures

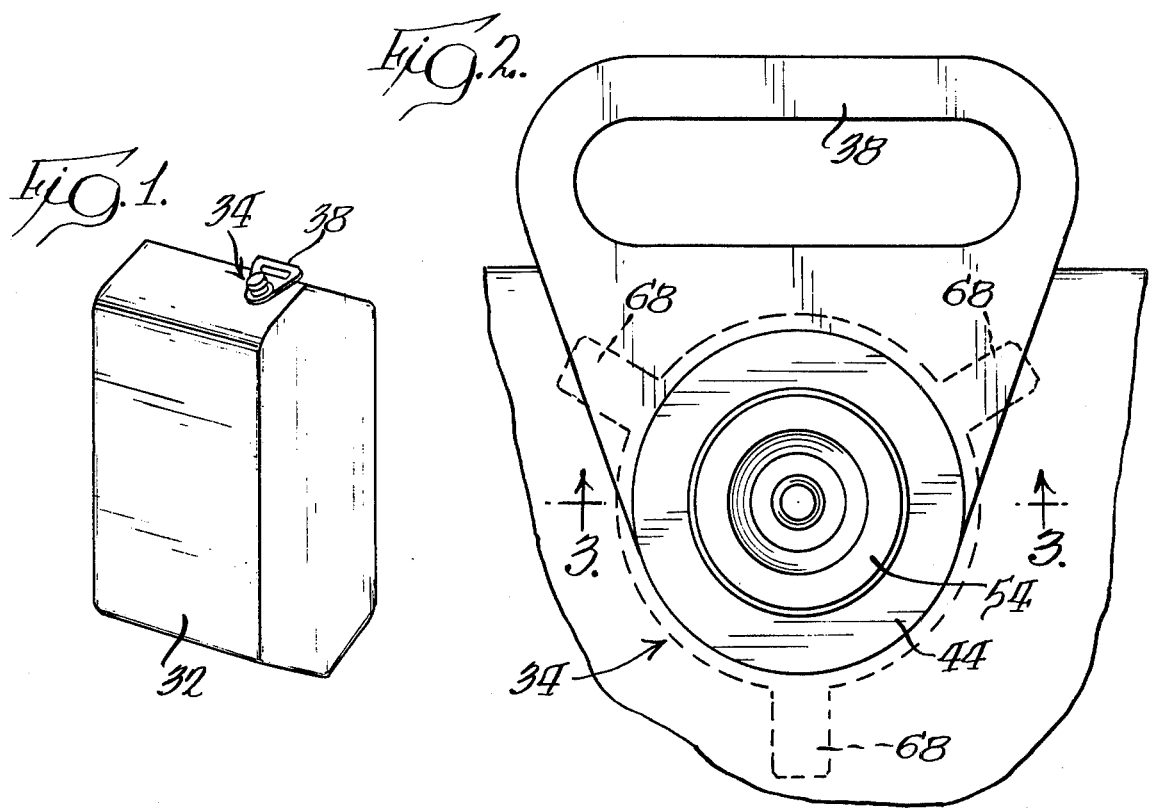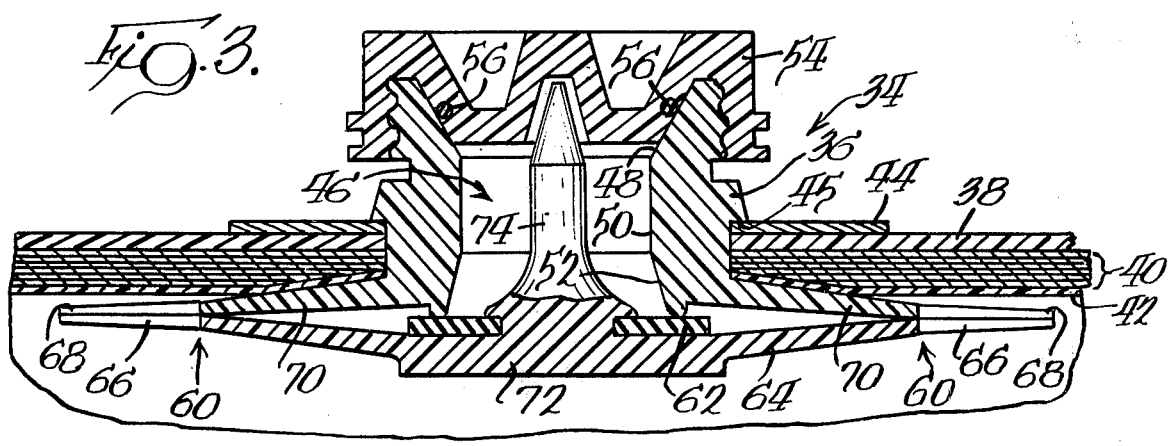

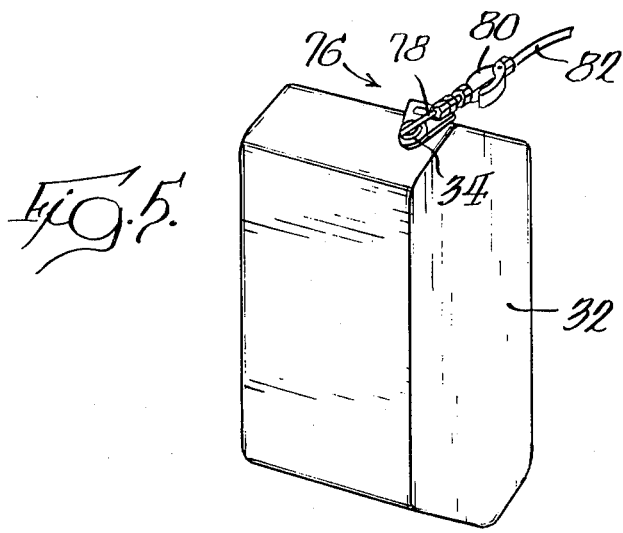
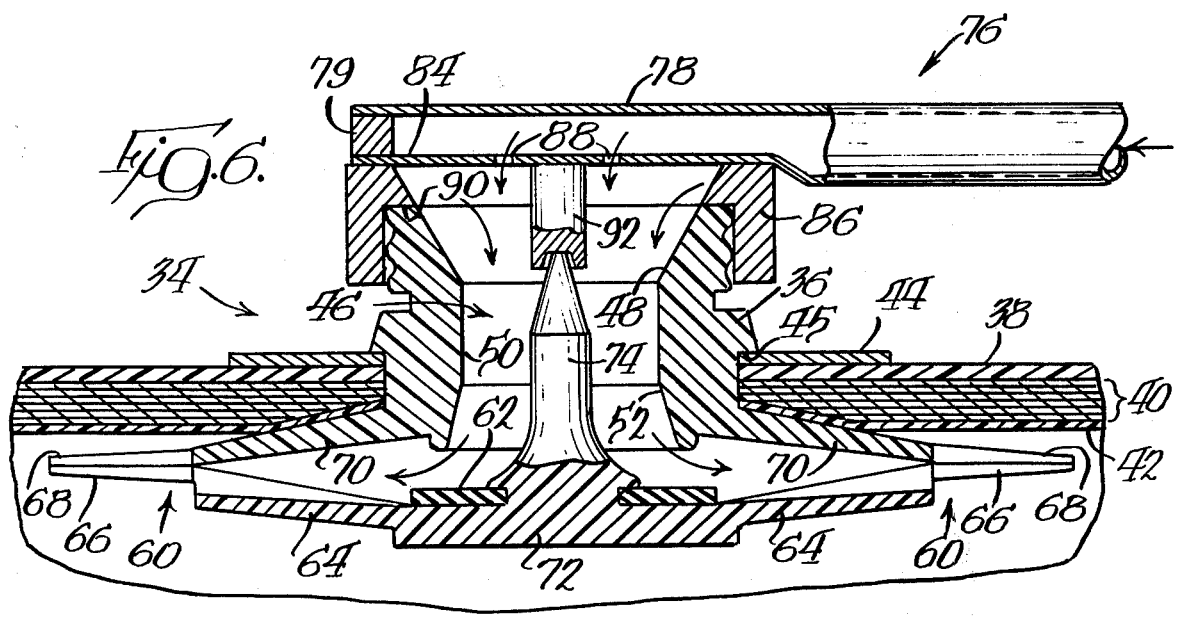
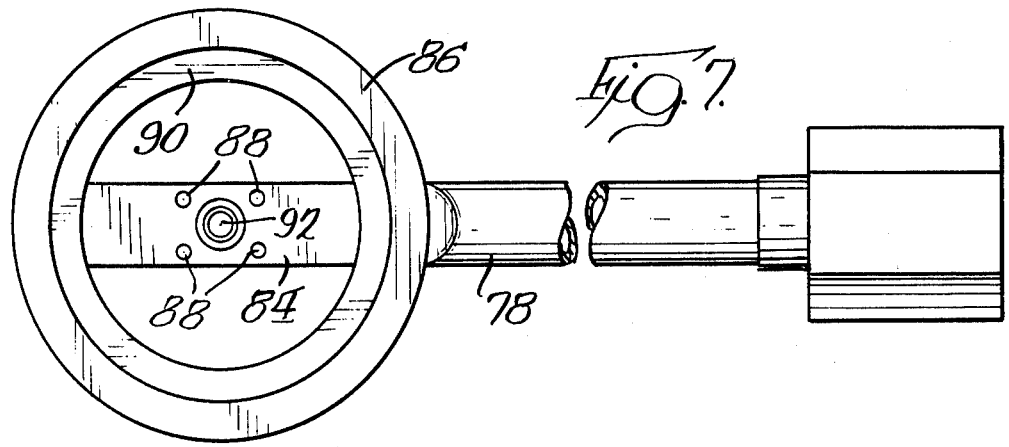

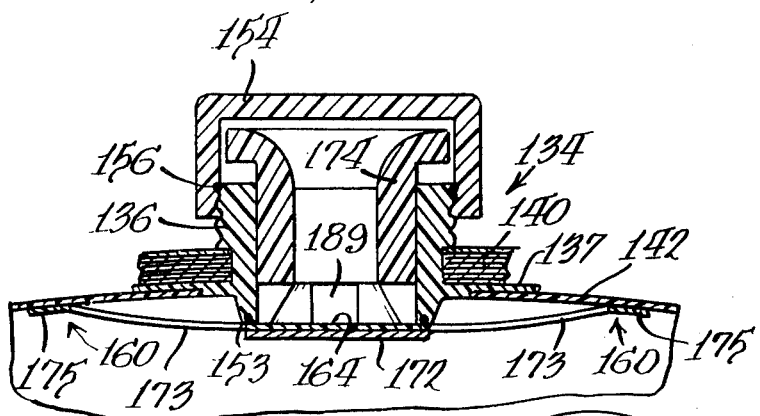
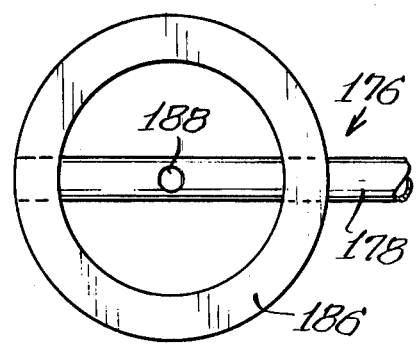
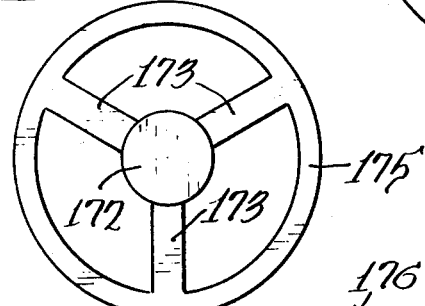
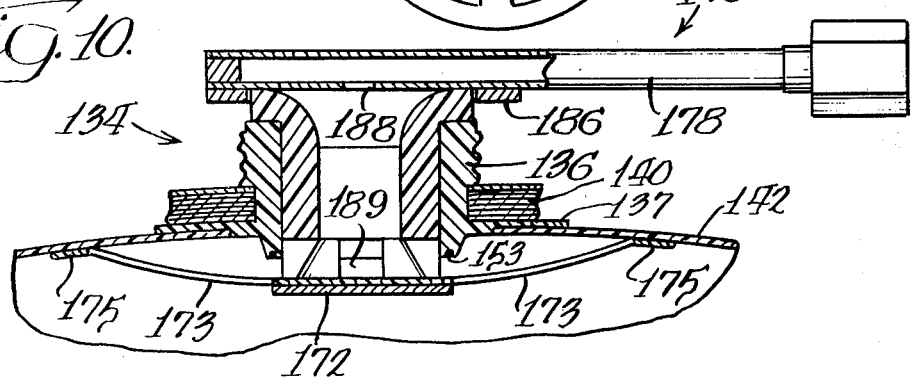
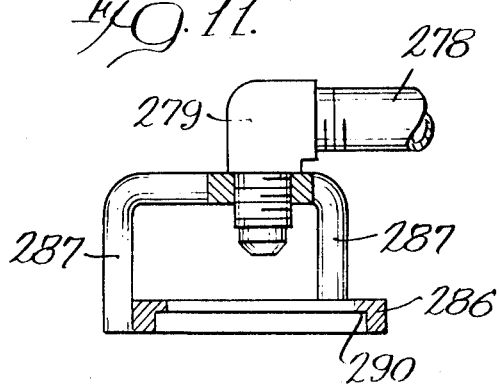
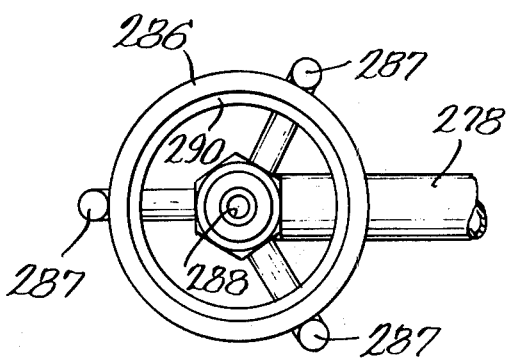

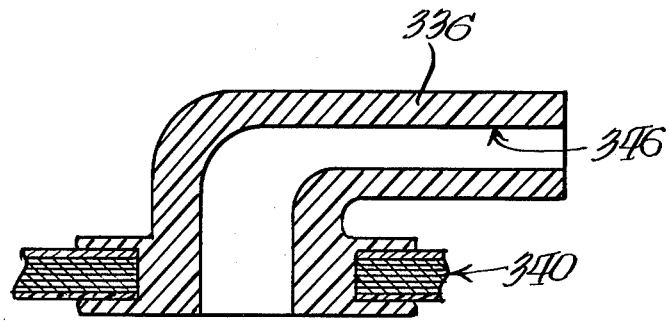
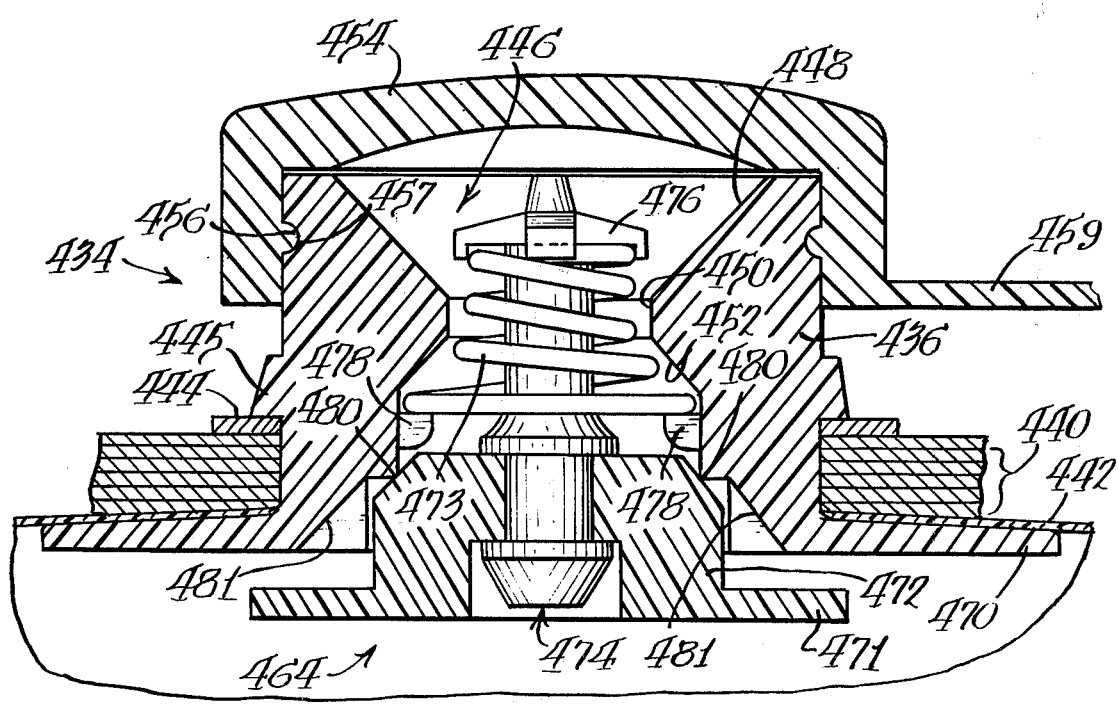

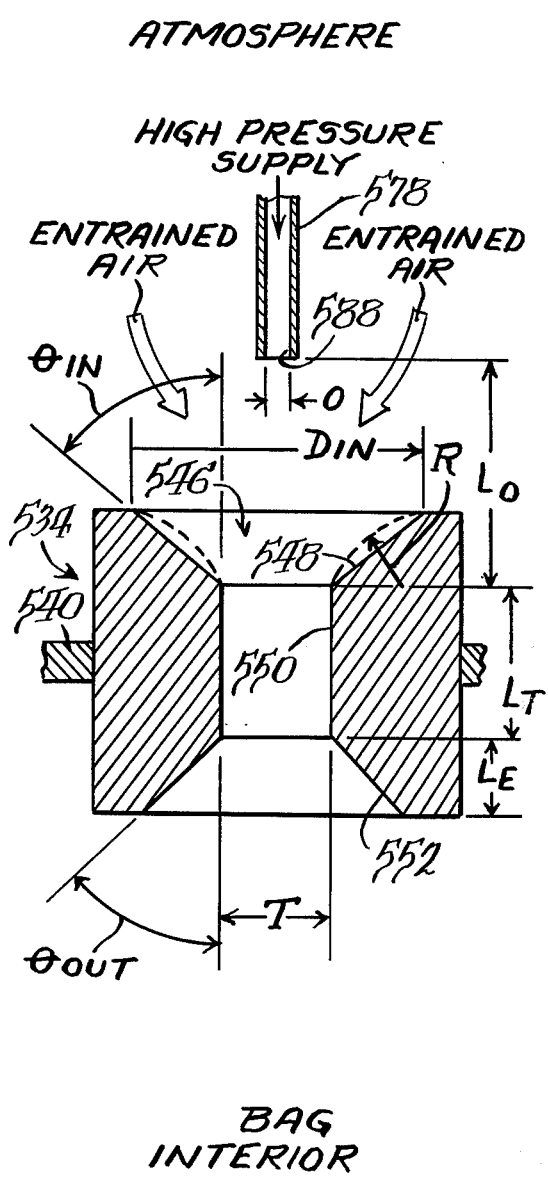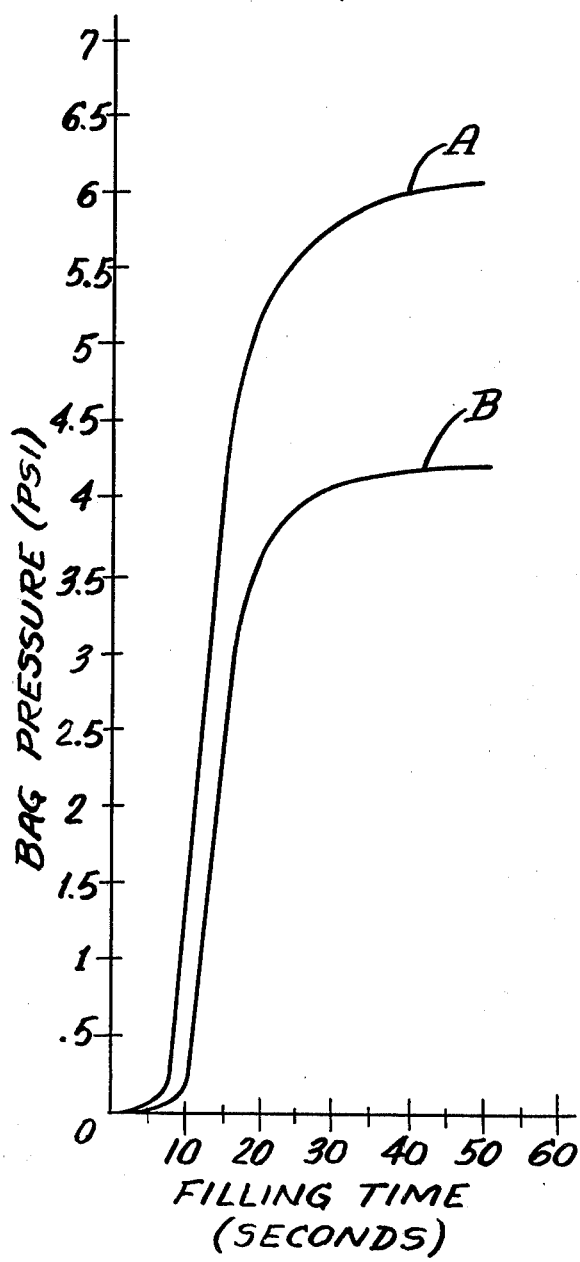

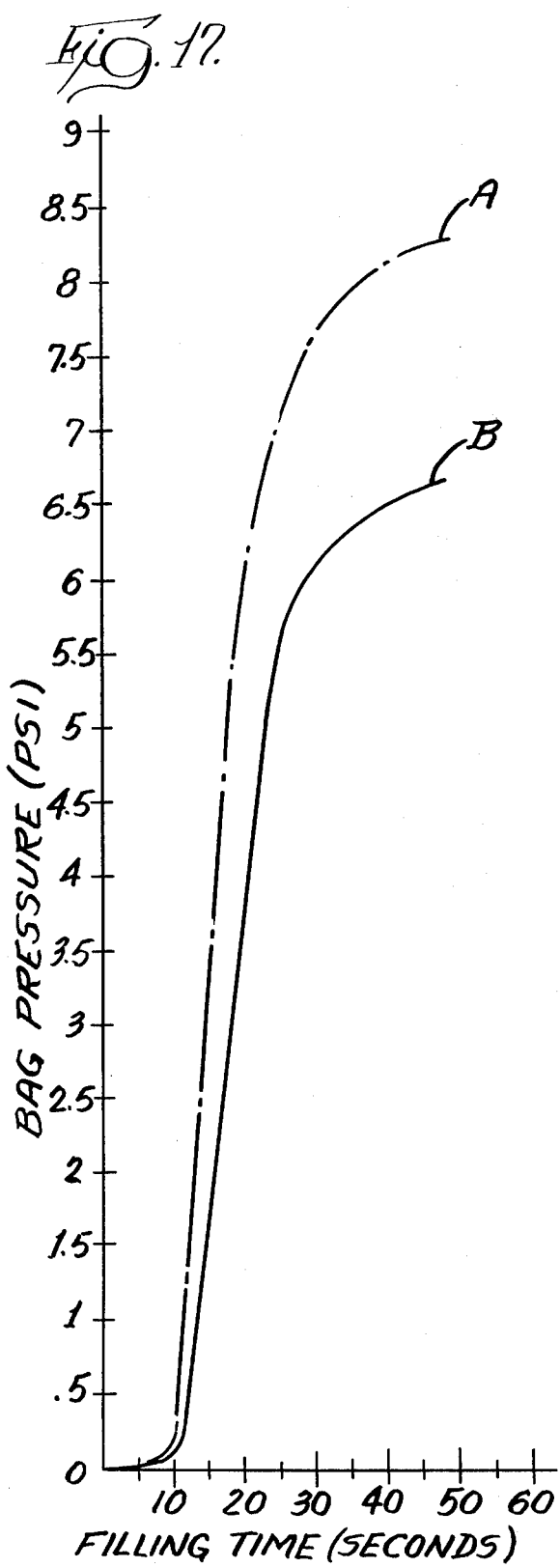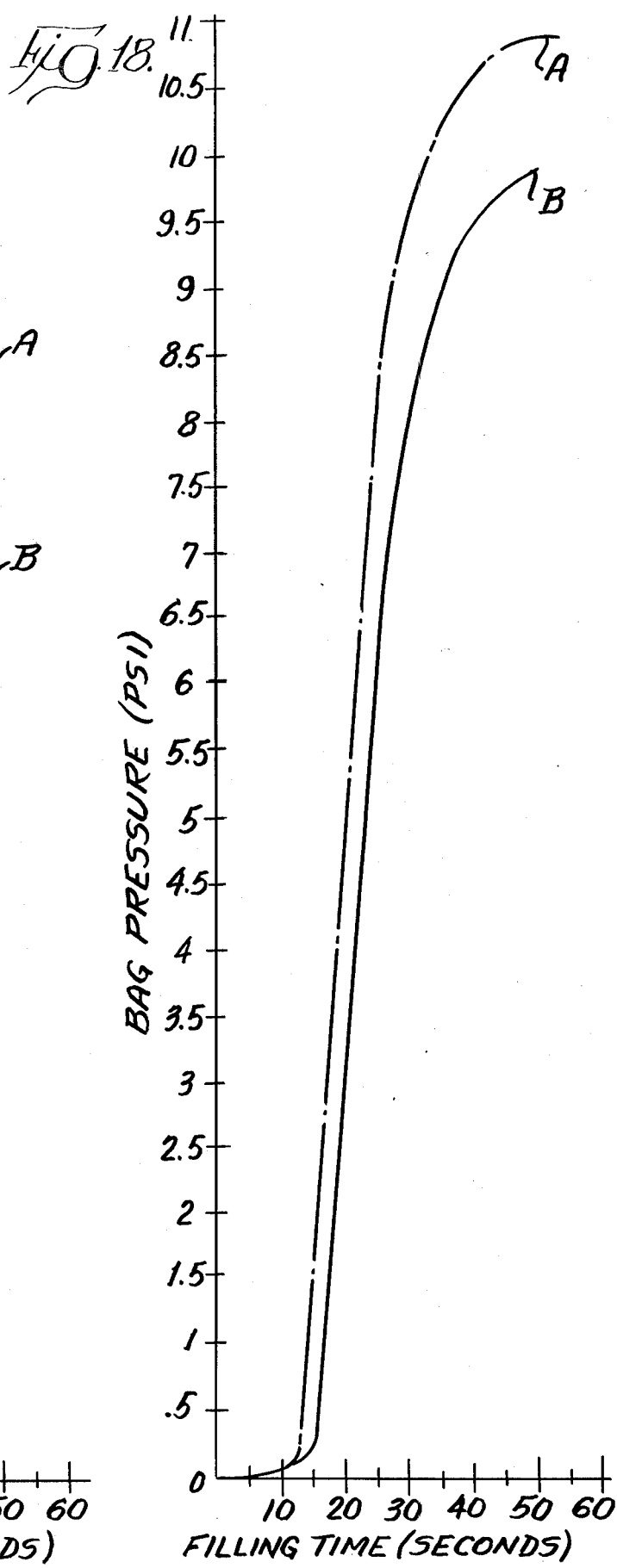

APPARATUS FOR RAPIDLY INFLATING AND PRESSURIZING A DUNNAGE BAG

BACKGROUND OF THE INVENTION

This application is related to the concurrently filed Angarola et al. applications, Ser. Nos. 820,210 and 820,163 entitled, respectively "Dunnage Bag Inflation Air Gun", and "Dunnage Bag Fill Valve", and U.S. Pat. No. 4,102,364 to Leslie et al. entitled "Method of Dunnage Bag Inflation".

This invention relates to dunnage bags for use in shipment of freight by rail, ship, truck, aircraft, and the like, and more particularly to inflatable disposable dunnage bags for such use. Dunnage bags may be reusable, and if reusable, are usually made of single of multiple plies of rubber, plastic, or fabric. Alternatively, dunnage bags may be disposable. Typically, such disposable dunnage bags have a gas-tight bladder (usually polyethylene) surrounded by an outer protective and supportive shroud consisting of one or more plies of material, usually heavy paper. The inflatable, disposable dunnage bags are used in freight carriers where it is customary to fill the spaces between the cargo, or between the cargo and the walls of the freight-carrier, to prevent the cargo from shifting and damaging either the cargo itself and/or the walls of the freight carrier. Inflatable, disposable dunnage bags are placed between the cargo in a deflated condition and are subsequently inflated with a gas, usually air, to a certain design pressure, typically between 1 and 8 pounds per square inch gauge, dependent on the size and wall structure of the particular bag.

Experience with this type of dunnage bag has revealed certain difficulties during inflation. First, in the United States, such dunnage bags are normally inflated with high pressure air nozzles through a valve in the side of the bag. The valves most commonly used are of the well-known Schrader type which are relatively small, having an exterior diameter of about 9/16 inches. These valves typically have a helical spring to bias a valve stem or plug against a relatively small internal orifice, usually between 1/16 and 5/16 inches in diameter. The valve housings are typically constructed of polyethylene which can be heat-sealed to the dunnage bag bladder to form an airtight connection. However, the valve stem is typically plastic or metal and the biasing spring is typically constructed from metal, such as steel. It would be desirable to simplify the valve construction and to reduce the cost of the valve by providing a design which could be constructed entirely from polyethylene and which would not require the use of many metal and plastic parts, e.g., a metal spring and a separate metal or plastic item.

Typically, dunnage bags are inflated with high pressure air in the range of between 30 and 120 pounds per square inch gauge. Thus, unless the inflation time or air pressure is carefully regulated (as by means of a pressure regulating device near the discharge of the air hose), it is quite easy to pressurize a bag beyond the design, or allowable, pressure and to thereby rupture and bag and possibly damage the cargo and/or carrier. Thus, it would be desirable to provide apparatus for handling a gas such as air to effect the filling of such dunnage bags without the danger of overpressurization.

It has been suggested that low pressure air could be used to fill dunnage bags. However, the use of low pressure air, by itself, has a number of drawbacks. First, the time required to fill a dunnage bag through the small internal orifice of the Schrader type valve in use today would be much longer than the time required to fill a dunnage bag when using high pressure air. Also, a dunnage bag can still be overpressurized and ruptured (which may damage the cargo) when using low pressure air unless the "low" pressure is adjusted low enough for the particular dunnage bag. Thus, in situations where a number of different sizes of dunnage bags (having different design fill pressures) are to be inflated with the same low pressure air supply, the low pressure air supply pressure would still have to be carefully requlated to accommodate each different bag being filled. To overcome these drawbacks, it would be desirable to provide apparatus for filling different design pressure dunnage bags with pressurized air relatively rapidly and to provide a means of self-limiting the maximum pressure to which the dunnage bag could be filled.

Another problem encountered with the filling of inflatable dunnage bags results from the fact that such bags are filled after they have been placed and positioned between cargo or between the walls of the freight carrier and the cargo. Consequently, there are many times when access to the fill valve on the dunnage bag is extremely limited. In those instances, there is very little clearance area around a fill valve and this precludes the use of large, elongated gun-type air injection mechanisms that stick out a number of inches from the top of the valve during inflation. Consequently, it would be desirable to provide a dunnage bag filling apparatus which could be mounted on the dunnage bag and which would project only a relatively short distance from the exterior surface of the bag.

SUMMARY OF THE INVENTION

In the instant invention, apparatus is provided for filling inflatable dunnage bags with a mixture of high pressure air and entrained ambient air. A fill housing is mounted in a wall of the dunnage bag and defines a chamber extending from an opening on the exterior of the bag to an opening in the interior of the bag. The housing may or may not have a valve closure means. An air injection device is placed on, or engaged with, a portion of the housing on the dunnage bag in a particular manner whereby one or more jets of pressurized gas, such as air, are injected into the chamber and whereby ambient air is entrained into the chamber from between portions of the injection device and the housing.

In the preferred embodiment of the present invention, the air injection device is used with a housing chamber having an inlet cross-sectional flow area equal to or greater than the sum of the cross-sectional areas of the discharging injection gas jets and this enables relatively large amounts of entrained ambient air to be aspirated through the valve which fills the bag fairly rapidly. Further, the amount of pressurized gas thus used is only a small fraction of the entrained ambient air which is aspirated through the housing chamber.

In the instant invention, the fill housing also preferably functions as a self-closing fill valve which has a valve seat around the periphery of the interior opening on the end of the housing in the bag and a valve means or closure member which is movable towards and away from the seat. The closure member is secured to a generally flat, inelastic, flexibly hinged mounting member which is disposed across the interior opening of the valve and which biases the valve member into sealing engagement with the seat to prevent flow of air from the inflated bag. A stem is provided in the valve chamber and is connected to the valve member so that when a suitably designed air injection device is engaged with the valve, the stem will be depressed to urge the valve closure member away from the valve seat to open the valve. In the preferred embodiment, the valve housing is polyethylene and is substantially cylindrical. The interior chamber is substantially cylindrical with a converging, frustoconical exterior opening and a diverging, frustoconical interior opening. The flexibly hinged mounting member is a substantially circular sheet of polyethylene covering and extending beyond the bottom of the valve housing. It is secured at intervals about its periphery with tabs to an upper mating flange extending from the valve housing. When the valve closure member is moved downwardly away from the valve interior opening in response to an air injection device engaging the stem, the bias of the flexibly hinged circular mounting sheet is overcome. The sheet then moves downwardly so that the incoming air can flow through the space at edges of the circular sheet and upper mating flange, between the tabs, to thereby fill the bag.

In the preferred embodiment, the air injection device has a hollow tubular member which can be connected to an air supply hose, or to an on-off valve on an air supply hose, and which functions to provide a rigid conduit for bringing the pressurized air or gas to the vicinity of, or adjacent to, the dunnage bag fill valve or fill housing. Mounted on the tubular member, near one end, is a ring-like alignment frame having an annular shoulder adapted to seat on the exterior portion of a cylindrical dunnage bag housing or fill valve so as to effect a relative alignment between the tubular member and the housing wherein the tubular member extends across the diameter of the chamber defined by the housing. When the air injection device is so engaged with the fill valve, ambient air is free to flow between the exterior portions of the tubular member and the chamber.

Circular gas jet discharge orifices are provided in a flattened wall portion of the tube facing the chamber of the dunnage bag fill valve or housing. The orifices are spaced at equal intervals about the perimeter of a circle in the flattened wall portion with the circle of orifices being substantially concentric with the ring-like alignment frame and thus having a central axis substantially coincident with the central axis of the dunnage bag fill housing or valve. Preferably, the diameter of the circle of orifices is less than the diameter of the exterior inlet opening of the valve chamber such that the orifices are spaced inwardly from the wall of the chamber and such that gas is discharged from the orifices and into and through the chamber, thereby aspirating ambient air from between the orifices and the chamber walls through the chamber and into the dunnage bag.

The tubular member is preferably a cylindrical tube with a diameter on the order of between 0.5 inch and 0.25 inches. The flattened wall portion of the tube (which contains the orifices) is preferably located by the ring-like alignment frame less than 0.125 inches above the top of the dunnage bag fill housing or valve. Thus, the total projection of the inflation device beyond the outermost portion of the dunnage bag fill housing or valve is 9/16 inch or less. Such a relatively small projecting engagement dimension is extremely advantageous from the standpoint of filling dunnage bags in situ between cargo items where only a few inches of clearance may exist around the dunnage bag fill valve or housing.

It is contemplated that the injection device can be used, for a given fixed construction, with various sizes of dunnage bags having various allowable design fill pressure levels. To this end, the fill housings or fill valves of the differently sized bags are provided with differing internal cross-sectional area dimensions. The ultimate pressure that may be achieved within a given bag has been found to be dependent on, among other things, the specific dimensions of the chamber in the fill housing or valve. Thus, with a given construction of the air injection device of the present invention, dunnage bags having differing maximum allowable pressure level requirements can be fabricated with fill valves having differing internal chamber dimensions but having the same exterior dimensions suitable for engagement with the air injection device. By properly matching the valve sizes with a specific air injection device, the single air injection device can have the capability of filling various sizes of dunnage bags, with each bag being filled to its maximum allowable pressure level and not in excess thereof. Thus, a single gun or air injection device of the present invention can be used in the field with a single preset pressure supply to fill a number of variously sized bags.

Numerous other advantages and features of the present invention will become readily apparent from the following detailed description of the invention and embodiments thereof, from the claims and from the accompanying drawings.

BRIEF DESCRIPTION OF THE DRAWINGS

In the accompanying drawings forming part of the specification and in which like numerals are employed to designate like parts throughout the same, FIG. 1 is a perspective view of an inflated dunnage bag with a fill valve device of the present invention located on one end of the bag and adapted to be used with the air injection device of the present invention;

FIG. 2 is an enlarged, partial top plan view of the fill valve device and dunnage bag;

FIG. 3 is a cross-sectional view taken generally along the plane 3—3 of FIG. 2;

FIG. 4 is a reduced bottom plan view of the valve illustrated in FIG. 3;

FIG. 5 is a perspective view of the dunnage bag illustrated in FIG. 1 showing a first embodiment of the air injection device engaged with the fill valve device;

FIG. 6 is an enlarged cross-sectional view of the air injection device and fill valve device illustrated in FIG. 5;

FIG. 7 is a bottom plan view of the air injection device of the present invention;

FIG. 8 is a cross-sectional view of a second embodiment of the coacting fill valve and air injection device of the present invention;

FIG. 8A is a reduced bottom plan view of the lower flexibly hinged biasing structure of the second embodiment of the fill valve of the present invention;

FIG. 9 is a partial plan view of the bottom of a second embodiment of the air injection device of the present invention;

FIG. 10 is a cross-sectional view of the second embodiment of the coacting air injection device shown engaged for filling a dunnage bag;

FIG. 11 is a partial side view of a third embodiment of the air injection device of the present invention;

FIG. 12 is a partial plan view of the bottom of the third embodiment of the air injection device illustrated in FIG. 11;

FIG. 13 is a cross-sectional view of a third embodiment of a fill device of the present invention adapted to be used with the air injection device of the present invention;

FIG. 14 is a cross-sectional view of a fourth embodiment of a full device of the present invention adapted to be used with the air injection device of the present invention;

FIG. 15 is a schematic representation of the third embodiment of the air injection device and coacting fill valve of the present invention;

FIG. 16 is a graph illustrating the relationship between filling time and inflation pressure for a nominal 3 psi gauge design pressure dunnage bag for different types of air injection devices.

FIG. 17 is a graph illustrating the relationship between filling time and inflation pressure for a nominal 5 psi gauge design pressure dunnage bag for different types of air injection devices; and FIG. 18 is a graph illustrating the relationship between filling time and inflation pressure for a nominal 8 psi gauge design pressure damage bag for different types of air injection devices.

DESCRIPTION OF THE PREFERRED EMBODIMENT

While this invention is susceptible of embodiment in many different forms, there are shown in the drawings and will herein be described in detail preferred embodiments of the invention. It should be understood, however, that the present disclosure is to be considered as an exemplification of the principles of the invention and is not intended to limit the invention to the embodiments illustrated.

In the following description, two digit numerals are used to refer to the embodiment illustrated in FIGS. 1-7, three digit numerals in the 100 series are used to refer to the embodiment illustrated in FIGS. 8-10, three digit numerals in the 200 series are used to refer to the embodiment illustrated in FIGS. 11 and 12, three digit numerals in the 300 series are used to refer to the embodiment illustrated in FIG. 13, and three digit numerals in the 400 series are used to refer to the embodiment illustrated in FIG. 14. The same last two digits in each numeral designates similar or functionally analongous elements in the various embodiments.

For ease of description, the apparatus of this invention will be described in a horizontal operating position, and terms such as upper, lower, horizontal, etc., will be used with reference to this normal operating position. It will be understood, however, that apparatus of this invention may be manufactured, stored, transported, sold and used in orientation other than the position described.

Referring now to FIG. 1, there is illustrated a typical inflatable dunnage bag 32 having on one end a fill housing or valve device 34 in accordance with the present invention adapted to coact with an air injection device or air gun in accordance with the present invention. Typically, the dunnage bag is a multi-ply bag and is made of a plurality of plies of paper, such as Kraft paper, which form an outer shroud around a heat sealable inner, thermoplastic, film-like liner or bladder. It is to be understood, however, that the valve of the present invention may be used with many other types of disposable and non-disposable inflatable dunnage bags, such as those discussed above in the section entitled "Background of the Invention."

Some types of dunnage bags are manufactured in different sizes having different inflated internal volumes and typically may be designed for light, medium, and heavy-duty use. For example, the assignee of this invention manufactures three sizes of dunnage bags, each using a different number of plies of paper. Bags having two plies of paper are used for light-duty use and have a nominal allowable, or design, fill pressure of three pounds per square inch gauge. A medium-duty bag has four plies of paper and a nominal design pressure of five pounds per square inch gauge. The heavy-duty bag has six plies of paper and a nominal design pressure of eight pounds per square inch gauge.

For purposes of economy of manufacture, uniformity of appearance, and convenience under field use conditions, the dunnage bag fill valve 34 is preferably located in the same position on the three sizes of bags and has the same exterior dimensions. The use of valves having the same exterior dimensions for all three types of bags has a further advantage in that, when the dunnage bags are filled by means of the coacting air injection device and fill valves of the present invention, the same size air injection device can be used for all three types of bags as will be explained in more detail hereinafter.

As illustrated in FIGS. 1, 2, and 3, the fill valve device 34 has a housing 36 mounted in, and extending through, the wall of the dunnage bag. Preferably, the housing is substantially cylindrical and fabricated from polyethylene. FIG. 3, which shows the valve device 34 mounted in the wall of the dunnage bag, best illustrates the dunnage bag wall structure of six plies of Kraft paper 40 which form the outer shroud around a thin, polyethylene bladder 42 (which is typically from 4 to 6 mils in thickness).

A handle 38 extends from the housing 36 on one side of the valve 34 and can be used for carrying the dunnage bag, as well as for locating the dunnage bag between cargo articles. The handle structure 38 is seen to be an essentially flat sheet (typically polyethylene) lying directly on top of the outermost one of the plies 40. A polyethylene lockwasher 44 may be snapped into place around the housing 36 below an annular shoulder 45 in the housing 36 to retain the valve in the dunnage bag.

The valve is specifically designed to provide a passageway of relatively large cross section to accommodate flow of air or other gases from the exterior to the interior of the bag. The housing 36 defines a substantially cylindrical chamber 46 extending from an opening on the exterior of the bag to an opening on the interior of the bag. The chamber preferably has a slanted or frustoconical inlet wall 48, a straight, or right cylindrical throat wall 50 and a slanted or frustoconical outlet wall 52.

A removable cap 54 may be provided to cover the exterior opening of the chamber 46 at the inlet wall 48 and is preferably adapted to sealingly engage the inlet wall 48 to prevent leakage of air from the bag after the bag has been inflated. To this end, an O-ring 56 may be provided on the inner surface of the cap 54 for compressively sealing against the frustoconical inlet wall 48.

Preferably, the housing 36 and cap 54 are adapted to threadingly engage whereby the cap 54 can be screwed tightly onto the housing 36 to form an effective seal. The outwardly slanting frustoconical shape of the inlet wall 48 and the mating configuration of the cap 54 permits transferance of a portion of the downward threading force directly against, and normal to, the slanted inlet wall 48 to assure sufficient compression of the O-ring 56, and as a consequence, provides a more effective seal. It has been found that if the slanted inlet wall 48 forms a large angle with respect to the vertical (say 60° or more) there is less chance that a good seal will be formed than if the angle is less than 45°.

After the apparatus of the present invention has been used for inflating and pressurizing a dunnage bag, it is necessary that some means be provided for preventing flow of the air out of the dunnage bag. Such a flow blocking or valve means is not necessary to the proper functioning of the apparatus of the present invention with respect to the dunnage filling and pressurization process per se. Obviously, however, it is preferable to incorporate the flow blocking or valve means as an integral part of the fill housing or fill valve device of the present invention. To this end, a variety of manual and automatic (including power-actuated) valve closure devices can be effectively used to block the air flow when the air injection device of the present invention is withdrawn from the dunnage bag fill housing. The valve closure need only provide a temporary seal if an outer cap is used to seal the fill housing after the air injection device is withdrawn.

There is illustrated in FIGS. 2 through 4 a preferred first embodiment of a fill housing or fill valve having a valve closure means to block flow from the bag when the bag is inflated. A generally flat, flexibly hinged mounting means 60 is disposed within the interior portion of the bag and biases the valve means, such as an annular sealing ring 62, against the portion of the housing 36 defining the interior opening of the chamber 46.

Specifically, as illustrated in FIG. 4, a lower biasing disc or circular flexible sheet 64 is provided with three tabs 66 which are then secured, as by friction welding, mechanical attachment, or heat-sealing, to tabs 68 which project from a circular flange 70 at the bottom of the housing 36. The upper surface of the flange 70 is secured, as by heat-sealing, to the underside or inside surface of the bladder 42 to provide an airtight seal between the inside of the bladder and the valve housing 36.

In operation, when the flexible sheet 64 is moved downwardly away from the valve housing 36 to open the valve, as will be explained hereinafter, the peripheral edges of the sheet 64 between the three tabs 66 separate from the peripheral edge of the overlying flange 70 to provide passages into the dunnage bag. The biasing disc or circular flexible sheet 64 preferably also includes a disc-like central portion or thickened reinforced central portion 72 to provide a stiffer and more rigid backing for the sealing ring 62 to thereby effect a better seal.

For opening the fill valve device 34 in response to engagement with the air injection device as will be described in detail hereinafter, a stem means or valve stem 74 is preferably secured, or integral with, the central portion 72 of the circular flexible sheet 64. The stem 74 is centered within the chamber 46 and projects upwardly into the exterior opening of of the housing 36.

It can be seen that the unique construction of the valve means 62, in combination with the flexibly hinged mounting means 60, provides a substantially flat valve structure which permits the bag, when deflated, to lie generally flat. Further, the unique flexibly hinged mounting means 60 provides proper valve closure biasing action without the use of the typical helical springs that are often used in valves on inflatable objects. Further, the flexibly hinged mounting means 60 and the other valve components, such as the circular flexible sheet 64 and the valve housing 36, can all be made from relatively inelastic and sturdy polyethylene which can be easily molded into the proper configuration and can be easily heat sealed where necessary to form the valve construction illustrated. It should also be noted that the flexible circular sheet 64 provides a baffle for deflecting incoming air to prevent impingement of the air on the portion of the wall of the thin, film-like bladder opposite the valve. Most importantly, the fill valve device 34 has an interior chamber 46 which provides a relatively large annular volume around the slender stem 74 to accommodate entrainment of ambient air through the valve and into the bag in cooperation with the coacting air injection device as will next be described.

An appropriately constructed air injection device or inflation air gun of the present invention is provided to coact with the chamber of the fill valve of the present invention for filling and pressurizing a dunnage bag by novel application of the jet pump concept. A jet pump effect is created by providing an air injection device which is adapted to coact with the dunnage bag fill valve and which permits a jet or jets of high pressure gas or air to be discharged from orifices through the chamber of the valve thereby entraining or aspirating ambient air from around the air injection device through the valve and into the dunnage bag. Specifically, high pressure gas or air jets are injected into the chamber in the dunnage bag fill valve. As each gas jet expands from its orifice, the velocity reaches a maximum in the narrow portion or throat area of the valve chamber. In accordance with Bernoulli's Principle, the pressure in the high velocity throat region of the chamber is substantially reduced (to a subatmospheric pressure value) and ambient air is thereby drawn, or aspirated, through the chamber. On the discharge side of the chamber, (i.e., inside of the dunnage bag) there are no walls to restrict lateral expansion of the air flowing into the bag and the velocity of the flowing fluid mixture decreases (as it must if the maximum flow rate is to remain equal throughout the length of the valve). To the extent that the valve chamber may have a diverging section opening into the interior of the bag, the pressure will increase in that section as the velocity decreases. That is, the velocity head will be converted back to pressure head in that section. Theoretically, the jet pump effect should be typically more pronounced when the fill valve has the typical thermodynamic nozzle configuration comprising a converging inlet, a minimum diameter throat area, and a diverging discharge section.

An air gun, designated generally by the numeral 76 in FIG. 5, is shown mounted on the valve 34 of a dunnage bag 32 during inflation of the dunnage bag. A pressurized gas conduit means or tube means for supplying pressurized gas, such as tubular member 78 is connected on one end to a conventional hand-operated pressurized gas supply on-off valve 80 which in turn is connected to a pressurized gas supply hose 82. The tubular member 78 may alternatively be directly connected to a source or supply of pressurized gas and may specifically be connected directly to the hose 82. An on-off valve, such as valve 80, may be located upstream in the hose or at a supply of pressurized gas, such as at a compressor or compressed air receiving tank. The valve 80 may be integral with the locator prong 92 for automatic opening when the gun is engaged with the valve. Alternatively, an on-off valve need not be used at all. In that case, pressurized gas can be allowed to continually discharge from the air injection device.

With reference to FIG. 6, the tubular member 78 is seen to be a substantially hollow tube which is plugged or closed at the end 79 opposite the connection to the pressurized gas supply. As best illustrated in the bottom view of FIG. 7, four orifices 88 are provided at equally spaced intervals about the perimeter of a circle in the tubular member 78 for discharging jets of pressurized gas into the dunnage bag valve. To position the tube 78 properly over the housing 36, a ring-like alignment frame 86 is mounted across its diameter to the tube 78 so that it is concentric with the circle of orifices 88. The alignment frame 86 has an annular shoulder 90 which is adapted to seat on, and engage the top of, the exterior portion of the housing 36. When the alignment frame 86 is thus engaged, the circle of orifices is concentric with the circular interior walls of the valve housing 36 and the center of the circle of orifices 88 is substantially coincident with the longitudinal axis of the cylindrical housing 36. A portion of the wall of the tube is flattened, as at 84, to accommodate the attachment of the alignment frame 86. The flattened section 84 further permits easier drilling or orifices 88 through the tube wall. As a result of the orifices 88 being drilled in the flattened section 84, the jets of pressurized gas discharge from the orifices in a substantially parallel relationship.

The ring-like structure of the alignment frame 86 permits free flow of ambient air past the exterior portions of the tube 78 as well as between the exterior portions of the tube 78 and the exterior portions of the valve housing 36. Thus, ambient air can be drawn into the region surrounding the orifices 88 and, under influence of the Bernoulli effect caused by the jets of high pressure gas discharging from the orifices 88 through the valve chamber 46, can be drawn, or aspirated, through the valve and into the dunnage bag. This action is efficiently promoted by using relatively small orifices having a relatively small combined cross-sectional flow area whereby the amount of high pressure air (or other gas) required to inflate the dunnage bag is considerably less than the amount of high pressure air required by filling devices which use only high pressure air. The efficiency is further effected by locating the orifices 88, in relation to the valve chamber 46, so that the orifices 88 are spaced from the walls of the chamber. The number of orifices and their size may be varied as desired to achieve the most efficient entrainment of ambient air for a given set of fixed conditions (e.g., a fixed valve size and shape and a fixed high pressure gas flow rate). For example, only one orifice may be provided and it may be located off-center with respect to the longitudinal axis of the valve housing 36. Alternatively, two or more orifices may be asymmetrically arranged to discharge into the chamber 46 and/or may be arranged to discharge the jets of gas in a non-parallel or skewed relationship. A single orifice means, such as an annular slit, could also be used.

The efficient entrainment of ambient air is further effected by a continuous, smooth flow surface from the valve to the alignment frame, Specifically, in FIG. 6 it can be seen that the inside surface of the ring-like frame 86 above shoulder 90 is frustoconical and has a conical angle identical to that of the mating frustoconical valve inlet section 48 to form a continuous, and extended, flow surface.

In order that the jets of high pressure gas and the entrained air can be passed through the valve and into the dunnage bag, the valve closure or annular sealing ring 62 must be moved away from sealing engagement with the interior opening of the valve housing. To this end, a prong means or prong 92 is secured to the flattened wall portion 84 of the tube 78 at the center of the circle of orifices 88 and extends downwardly to engage and depress the stem 74 when the air gun is mounted on the valve housing 36 and aligned with the chamber 46 for discharging jets of pressurized gas therein. When the stem 74 is thus depressed, the incoming air and/or gas can pass between the circular flexible sheet 64 and the valve housing flange 70 and then out through the openings at the periphery of the flange 70 and circular flexible sheet 64, between the three pairs of flexibly hinged tabs 66/68, as is best illustrated in FIG. 6.

Of course, it is to be understood that the air inflation device and a dunnage bag fill housing of the present invention can properly coact to pressurize a bag even though the fill housing may not have a self-closing or automatically closing valve means. However, to maintain the bag in the inflated, pressurized condition, it is necessary to prevent the pressurized air from escaping from the bag. To this end, it is preferable to have a valve closure means integral with the fill housing as previously described. However, other types of closure means could be provided. For instance, instead of having a circular flexible sheet 64 and valve means or annular sealing ring 62 as illustrated in FIG. 6, a separate, manually actuated valve means could be used. Such a valve means might consist of a pivoting or sliding closure member which could be moved into position to block flow out of the dunnage bag through the chamber 46 after the dunnage bag design fill pressure level had been reached. Also, a separately power-actuated valve closure member could be employed that would close the valve in response to either an initiation action by the operator or automatically, upon sensing of a predetermined pressure level within the dunnage bag.

Other types of valve means or closure members that can be used with the fill housing device of the present invention are described in the previously cited application of Angarola et al. entitled "Dunnage Bag Fill Valve" and attention is directed thereto, with specific reference to FIGS. 8-14.

When the inflation air gun device and fill valve device of the present invention are engaged to coact to inflate a dunnage bag, a most useful and advantageous phenomenon is effected. Specifically, it has been found that for a given size and shape air gun, the size and shape of the valve can be designed so as to permit the filling of a dunnage bag with entrained ambient air up to a specific stabilized maximum pressure level, but not in excess of that level. In particular, if the inflation air gun is engaged with a dunnage bag fill valve and is left injecting high pressure gas jet or jets therein, the pressure within the bag will reach a certain level, at which time the pressure will not increase any further. Though the high pressure gas jets and entrained ambient air would still be directed into the fill valve housing, an equilibrium is reached where the mass flow rate of air entering the valve equals the flow rate of air being discharged from, or deflected out of, the dunnage bag in response to the internal bag pressure. Thus, dunnage bags can be equipped with fill valves of the present invention which are sized to coact with a particular construction of a single common air fill gun so that each dunnage bag can be filled only to its design pressure level and so that each dunnage bag cannot possibly be overpressurized so as to rupture. Experimental data relative to this phenomenon will be discussed following the description of other embodiments of the apparatus of the present invention.

FIGS. 8 and 8A illustrate a second embodiment of a dunnage bag fill valve device 134. Certain features of this valve are also described in the previously cited concurrently filed application of Angarola et al., entitled "Dunnage Bag Fill Valve", and attention is directed thereto (especially to FIGS. 12-14). Like the first embodiment of the fill valve 34 previously described, valve 134 has a housing 136 mounted within the wall of a dunnage bag. The housing is substantially cylindrical and has an annular flange 137 which is secured, as by heat sealing, to the upper or exterior surface of a bladder 142. The flange 137 also functions to support and retain the plies 140 which lie immediately above it. An O-ring is provided inside the bag at the end of the housing 136 and functions as a valve seat. A flexibly hinged mounting means 160 is used to secure a biasing disc or circular flexible sheet 164 across the interior opening at the bottom of the valve housing 136 to provide a valve closure. The valve closure disc 164 is reinforced in its central portion by a smaller circular sheet or disc 172. Spaced equally about, and extending outwardly from, the valve disc 164 are arms 173 which are secured to, or are integral with, a bladder attachment ring 175. The ring 175 is attached, as by heat sealing, to the underside, or inside surface, of the bladder 142. Preferably, the valve closure disc 164, the circular reinforcing sheet 172, and the arms 173 are made of polyethylene. The closure 164 is biased against the interior opening of the valve housing 136 by the flexibly hinged means or hinge connection 160 where the arms 173 join the bladder attachment ring 175. Thus, if the valve closure disc 164 were pushed downwardly away from the interior opening of the fill valve housing 136, the arms 173 would be pulled away from the wall of the bladder 142 also. To some extent, the wall of the bladder 142 would be pulled inwardly at the point of attachment to the ring 175 to contribute some amount of the flexible hinge action.

To open the valve 134 and allow passage of air therethrough as just described, a stem means 174 is provided in the interior chamber of the valve housing 136 and is adapted to be engaged by an air gun of the present invention as will be described hereinafter. The stem 174 is a hollow, substantially cylindrical member slidably disposed within the valve housing 136 and adapted for vertically reciprocable movement therein.

A cap 154 may be provided for threadingly engaging the valve housing 136 and the cap 154 may hold an O-ring 156 to bear against an exterior portion of the housing 136 to provide a secondary seal.

A second embodiment of the air gun of the present invention is designed to be used with the fill valve illustrated in FIGS. 8 and 8A and is designated generally as 176 in FIGS. 9 and 10. Like the first embodiment illustrated in FIGS. 6 and 7, the air gun 176 has a hollow cylindrical tube 178 for supplying pressurized gas or air to the fill valve and has a ring-like alignment frame 186 disposed at one end of the tube and mounted across its diameter to the tube. In the tube 178, at the center of the ring-like frame 186, an orifice 188 is provided for emitting a jet of pressurized gas or air. When the gun 178 is engaged with the dunnage bag fill valve 134, as illustrated in FIG. 10, the ring-like frame 186 fits around the periphery of the exterior portion of the valve 134 and aligns the orifice 188 in the center of the valve chamber so that the jet of pressurized gas or air exiting from the orifice 188 is directed into and through the valve 134. When the gun 176 is engaged with the valve 134, it must be pushed downwardly to move the stem 174 into the valve to push the valve disc 164 away from the interior opening of the valve and allow passage of the entrained ambient air therethrough. To this end, the bottom portion of the stem 174 is provided with apertures, such as the aperture 189, illustrated in FIGS. 8 and 9, through which the incoming air flows as it passes into the dunnage bag.

As can be seen, the second embodiment of the air gun 176 illustrated in FIGS. 9 and 10, has certain advantages compared to the first embodiment illustrated in FIGS. 6 and 7. Specifically, owing to the particular construction of the dunnage bag fill valve 134, there is no need to have a prong member or prong means, such as prong 92 on the air gun 76 illustrated in FIG. 6.

A third embodiment of the air gun of the present invention is illustrated in FIGS. 11 and 12. The third embodiment is deisgned to be used with the second embodiment of the dunnage bag fill valve illustrated in FIGS. 8 and 10, that is, one that does not have a central stem means for actuating a valve closure means. The third embodiment of the air gun has a substantially hollow, cylindrical extension tube 278 with a fitting (not illustrated) on one end for connection to an air hose and a tip tube 279 disposed at a substantially right angle to the extension tube 278. As best illustrated in FIG. 12, the tip tube 279 has an orifice 288 in its distal end for the discharge of a gas or air jet. The gun is aligned over the dunnage bag fill valve with a mounting ring 286 which is secured to the tip tube 279 by a plurality of outwardly and downwardly extending legs 287. A shoulder 290 is provided within the alignment ring 286 for engaging the top portion of the dunnage bag fill valve stem such as the top portion of stem 174 illustrated in FIG. 8.

Other modifications to the air injection device of the present invention relating to the use of screens to prevent entrainment of particulate matter and to the use of blow-back telltale mechanisms are described in the previously cited application of Angarola et al. entitled "Dunnage Bag Inflation Air Gun" and reference is directed thereto.

Another modification of the fill housing of the present invention is illustrated in FIG. 13. The housing 336 is mounted in the wall 340 of a dunnage bag. The housing 336 has two substantially cylindrical portions at a right angle to each other. A substantially circular cross-section chamber 346 is defined in the housing and communicates between the exterior and interior of the bag. The bag may be inflated through housing 336 with an air gun, such as those embodiments previously described and illustrated in FIGS. 5-7 and 10-12. The fact that the housing 336 is "angled" so that a portion is parallel to the bag wall has advantages in certain "low-clearance" applications where dunnage bags are regularly used in a particular orientation. Though a valve member is not illustrated with housing 336, it is to be understood that a valve member of appropriate design may be incorporated.

Another modification of the fill housing of the present invention is illustrated in FIG. 14 and is generally designated therein by numeral 434. The device 434 has a substantially cylindrical hollow housing 436 mounted in, and extending through, the wall of a dunnage bag which is indicated as being six plies of Kraft paper 440 forming an outer shroud around a thin polyethylene bladder 442. A lock washer 444 may be snapped into place around the housing 436 below an annular shoulder 445 to retain the valve in the dunnage bag.

A circular flange 470 is provided at the bottom of the housing 436. The upper surface of the flange 470 is secured, as by heat-sealing, to the underside or inside surface of the bladder 442 to provide an airtight seal on the inside of the bladder and the valve housing 436.

The valve is specifically designed to provide a passageway of relatively large cross section to accommodate flow of air or other gases from an injected stream to the interior of the bag. The housing 436 defines an interior chamber 446 extending from an opening on the exterior of the bag to a opening in the interior of the bag. The chamber preferably has a slanted or frustoconical inlet wall 448, a straight or right cylindrical throat wall 450 and a slanted or frustoconical diverging wall 452.

A removable cap 454 may be provided to cover the inlet opening of the chamber 446 and is preferably adapted to engage the housing 436 to protect the valve after the bag has been inflated. The cap 454 has an inner vertical wall with an annular snap-in flange 456 for being received by an annular channel 457 in the housing 436 to lock the cap in place over the housing 436. The cap 454 may further be directly connected to the housing 436 or another portion of the dunnage bag by means of a strap 459 (the connection of the strap to the housing or dunnage bag is not illustrated).

Disposed within the housing 436 is a valve means or member 464 which sealingly engages the outlet opening of the valve housing 436. The valve member 464 comprises a stem 474, a plug portion 472, and a bias spring 473. The bias spring 473 is engaged on one end by a cruciform-shaped retainer 476, and on the other end, by four projections 478 (only 2 show in FIG. 14) which extend into the chamber 446 from the housing 436. Bias spring 473 is mounted under compression between the retainer 476 and projections 478 and therefore continuously biases the valve member 464 upwardly so that the plug portion 472 sealingly engages the outlet of the valve housing 436, such as at seating edge 480. Apertures 481 are provided in the valve housing 436 below the seating edge 480 to provide an increased flow area past the plug 472. The plug portion 472 preferably has an annular flange 471 which projects outwardly and overlies a portion of the valve housing 436 to provide a baffle which deflects the incoming air stream when the valve is opened and air is being injected therethrough.

The dunnage bag may be inflated through the housing 436 with an air gun, such as the embodiment previously described and illustrated in FIGS. 5-7, in a manner previously described with reference to FIGS. 5 and 7.

For a given size dunnage bag and for a given available gas or air supply pressure, the gun and valve apparatus of the present invention can be judiciously designed to 1) establish the maximum stabilized pressure level to which the bag can be filled and 2) optimize the length of time required to fill a dunnage bag to a specific pressure level. The principles of such design can be best explained with reference to the schematic representation in FIG. 15. A dunnage bag fill housing or valve is schematically represented and designated by the numeral 534. The valve 534 is mounted in the wall 540 of a dunnage bag. The valve housing is substantially cylindrical and defines an interior chamber 546 which has a frustoconical converging wall structure or inlet 548, a substantially cylindrical wall structure or throat 550 at the minimum cross-sectional area of the chamber 546, and a frustoconical diverging wall structure or outlet 552. An air inflation gun is schematically represented as having a tube portion 578 with an orifice 588.

Experiments have been conducted with injection devices and valves of the present invention as schematically represented in FIG. 15 wherein a number of the physical parameters were varied. Specifically, experiments were conducted to determine how changes in the number of gun orifices, the orifice size, and the orifice configuration affect the dunnage bag maximum stabilized pressurization level and the time required to fill a given dunnage bag to its maximum stabilized pressurization level.

Tests were performed with different types of gun structures for a given valve having a 45° converging inlet to determine the effect of gun structure on the maximum stabilized pressurization level. In that experiment, a multi-orifice gun similar to that illustrated in FIGS. 5 and 7 was used. The gun had four orifices equally spaced about a 0.25 inch diameter circle (as best illustrated in FIG. 7), each having a diameter O of 0.073 inches. The other parameters such as hose length, high pressure air supply pressure, orifice distance, $L_O$, and the valve remained constant. Specifically, the guns were connected to a 10-foot length of standard ⅜ inch nominal inside diameter air hose and supplied with air at 80 psi gauge on the upstream end of the hose (the pressure at the gun inlet was 62 psi gauge under full flow conditions). The valve was mounted in a 6-ply dunnage bag having an internal inflated volume of 11.76 cubic feet and a nominal design pressure of 8 psi gauge. With reference to FIG. 15, the valve used in the test had a throat diameter, T, of 0.456 inches, an outlet angle $\theta_{OUT}$, of 30°, a throat length, $L_T$, of 0.156 inches, and an exit length, $L_E$, of 0.25 inches. It was found that the multi-orifice gun provided a higher stabilized pressurization level than the single orifice gun when using a 45° inlet on the valve. It should be noted that the multi-orifice gun has a total cross-sectional jet flow area of the four 0.073 inch diameter orifices that is less than the cross-sectional jet flow area of the single orifice gun having a 0.45 inch diameter orifice.

Tests were performed to determine the effect of varying the gun structure on the maximum stabilized pressurization level for the three types of bags. Two types of gun configurations, both corresponding generally to the multi-orifice first embodiment illustrated in FIGS. 5 through 7, were used in this test. Bag pressure versus filling time was plotted for the 3 psi, 5 psi, and 8 psi nominal design pressure bags in FIGS. 16 through 18, respectively, for the two types of guns. In those figures, curve A represents a gun having four orifices equally spaced about a 0.25 inch diameter circle (as best illustrated in FIG. 7), each having a diameter, O, of 0.098 inches and the curve labeled B represents a gun having a construction identical to the gun of curve A except that the orifice diameter, O, was 0.073 inches. Each gun was connected to a 10-foot length of standard ⅜ inch nominal inside diameter air hose and supplied with air at 80 psi gauge on the upstream end of the hose. The pressure at the gun inlet under full flow conditions was 55 psi gauge for the 0.098 inch orifice gun (Curve A) and was 63 psi gauge for the 0.073 inch orifice gun (Curve B). All three of the bags had the same volume of 11.76 cubic feet. The valves used with the three bags were of the type illustrated for the first embodiment in FIGS. 5 through 7 having a 45° converging inlet section. Referring to FIG. 15 for the 3, 5, and 8 psi nominal design bags the throat diameter, T, was 0.625 inches, 0.531 inches, and 0.421 inches, respectively, and the distance from the top of the throat to the gun orifice $L_O$, was 0.266 inches, 0.312 inches, and 0.367 inches, respectively.

As can be seen from the three figures, the gun having the larger diameter orifices (as represented by curve A) effected a greater maximum stabilized pressurization level for each bag than did the gun having the smaller 0.073 inch diameter orifices. However, it should be noted that in all cases, the pressures achieved were greater than the nominal design pressure. For example, in FIG. 16 (3 psi bag) curve A shows a maximum stabilized pressurization level of 6.1 psi and curve B shows a maximum stabilized pressurization level of 4.25 psi. Both of these levels are above the nominal 3 psi design pressure. By appropriate changes to one or more of the parameters affecting the gun and/or the valve, the maximum stabilized pressurization level can be reduced to the 3 psi level. For example, the air pressure could have been reduced, the orifice diameter could have been reduced, or the valve shape and size could have been changed.

The curves in the graphs in FIGS. 6 through 8 illustrate another interesting characteristic of the apparatus of the present invention. It can be seen that a significant parameter affecting the maximum stabilized pressurization level is the throat diameter of the dunnage bag fill valve. Specifically, the smallest throat diameter is 0.421 inches for the 8 psi bag which was pressurized to the highest level, about 10 psi. The largest throat diameter is 0.625 inches for the 3 psi bag which had the lowest stabilized pressurization level, about 4 psi. Thus, the smaller the throat diameter of the valve chamber, with all other parameters fixed, the higher the maximum stabilized pressurization level. This characteristic allows an air injection device of one specific configuration and size to be used with a variety of dunnage bags having different design or nominal design pressure levels whereby each dunnage bag can be inflated to the predetermined maximum stabilized pressure level corresponding to the safe design limit. And further, the characteristic permits the valves that are used in the variety of dunnage bags to have the same exterior size and shape with the only difference being the diameter of the interior throat section.

It has been found that one gun can be used to fill three different size dunnage bags. In particular, it was desired to inflate 6-ply, 4-ply and 2-ply dunnage bags, each having a volume of 11.76 cubic feet, to their nominal design pressure rating of 8 psi, 5 psi, and 3 psi, respectively. The bags were equipped with fill valves similar to the one illustrated in FIGS. 1 through 4. With reference now to FIG. 15, the inlet angle, $\theta_{IN}$, was set at 45° for all bags and the outlet angle, $\theta_{OUT}$, was set at 30° for the 6 and 4-ply bags and at 15° for the 2-ply bag. The overall length of the valve, from the exterior opening to the interior opening was 0.65 inches for all three valves and the inlet diameter, $D_{IN}$, was 0.906 inches for all three valves. The throat diameter, T, was set at 0.421 inches, 0.531 inches, and 0.625 inches for the 6, 4, and 2-ply bags, respectively. The air inflation gun, identical in configuration to the gun 76 illustrated in FIGS. 5 through 7, was then developed to fill the 6, 4, and 2-ply bags to their respective nominal design pressures. The four orifice holes in the gun were equally spaced about 0.25 inch diameter circle and each hole had a diameter, O, of 0.073 inch. When the gun was mounted on each valve, the orifices were maintained 0.125 inches above the valve by the alignment frame of the gun. The gun was supplied with air at 80 psi gauge static pressure at the upstream end of a 61-foot length of standard ⅜ inch nominal internal diameter air hose. The pressure at the gun under full flow conditions was 62 psi gauge. An 80 psi supply pressure and a 61-foot hose length would be typical for conditions encountered in the field. When such a gun was used to inflate the 6, 4, and 2-ply bags having the fill valves with dimensions described above, the bags were inflated to a safe allowable maximum stabilized pressurization level of 8.5 psi, 5.4 psi, and 3.5 psi, respectively.

Thus, it can be seen that the novel apparatus of the present invention can be designed for use with specific sizes of dunnage bags. By appropriate selection of the size and shape of the fill valve, orifice configuration, orifice size, orifice-to-valve distance, and supply air pressure, the apparatus can be designed to effect any desired maximum stabilized pressurization level within the bags.

Of course, for ease of use in the field, it would be most convenient to use a single gun (with a standard length of hose and air supply pressure) that could be used to fill any of the three types of bags (each having an appropriately sized valve) to a stabilized pressurization level equal to the safe design pressure limit of each bag. However, it would be possible to use only one size and shape of valve in the different types of bags and to require the operator to vary the supply pressure to the air inflation gun as necessary (as predetermined by experiment) to automatically fill each bag to a stabilized pressurization level equal to the safe design pressure level for the particular bag. This is not to be recommended, however, since the operator could make a careless adjustment of the supply pressure and overpressurize a bag, thereby causing its rupture.

It should be understood that the novel air injection apparatus of the present invention could be used with suitable designed valves on many types of dunnage bags, including single ply (paper or non-paper) disposable bags and including reusable bags, such as those having a rubber, fabric, or plastic wall structure.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

We claim:

1. An apparatus for rapidly filling and pressurizing an inflatable dunnage bag with entrained ambient air to a self-limiting maximum stabilized pressure level, said apparatus comprising:

a housing mounted in a wall of said dunnage bag and extending from the exterior of the bag to the interior of the bag, said housing defining a chamber having an exterior opening in a portion of the housing on the exterior of said bag and an interior opening in a portion of the housing communicating with the interior of said bag;

pressurized gas conduit means for supplying gas adjacent said housing;

alignment means movable relative to said housing and secured to said conduit means for locating said conduit means relative to said housing and in alignment with said chamber, said alignment means spaced from portions of said conduit means whereby ambient air can flow past exterior portions of said conduit means to said chamber; and orifice means associated with said conduit means for discharging at least one jet of pressurized gas through at least one orifice, said orifice means positioned on said conduit means in spaced relation from the walls of the chamber when said conduit means is aligned with said chamber whereby at least one jet of pressurized gas is directed into said chamber to aspirate the ambient air past said orifice means and through the chamber into said bag.

2. The apparatus in accordance with claim 1 in which the cross-sectional flow area of said chamber exterior opening is not less than the sum of the cross-sectional flow areas of all such orifices.

3. The apparatus in accordance with claim 2 in which said chamber is oriented about a central longitudinal straight-line axis between said exterior and said interior opening.

4. The apparatus in accordance with claim 3 further comprising: valve means movable against said housing for blocking flow through said chamber and means for moving said valve means against said housing to prevent flow from the bag after the bag is inflated.

5. The apparatus in accordance with claim 3 in which said chamber has a frustoconical converging inlet section at said exterior opening.

6. The apparatus in accordance with claim 5 in which said inlet section has a converging inlet angle of 45° with respect to said longitudinal axis.

7. The apparatus in accordance with claim 5 in which said alignment means includes a ring-like frame having an annular shoulder for engaging thereon the exterior end of said housing and further having a frustoconical inner surface mating with, and extending from, said frustoconical inlet section of said chamber to provide a continuous, smooth flow surface.

8. The apparatus in accordance with claim 3 in which said chamber has a frustoconical diverging outlet section at said interior opening.

9. The apparatus in accordance with claim 3 in which said housing is generally cylindrical and in which said chamber has a substantially cylindrical throat region.

10. The apparatus in accordance with claim 9 in which said conduit means comprises a tube having a flattened side and said orifice means comprises four circular orifices equally spaced about a circle in said flattened side, said circle of orifices having a diameter less than the diameter of said throat region.

11. The apparatus in accordance with claim 3 in which said chamber has a convexly curved converging inlet wall section at said exterior opening.

12. An apparatus for rapidly filling and pressurizing an inflatable dunnage bag with entrained ambient air to a self-limiting maximum stabilized pressure level, said apparatus comprising:

a fill valve, said valve having a housing mounted in a wall of said dunnage bag and extending from the exterior of the bag to the interior of the bag, said housing defining a chamber having an exterior opening in a portion of the housing on the exterior of said bag and an interior opening in a portion of the housing communicating with the interior of said bag, said chamber oriented about a central longitudinal straight-line axis between said exterior and interior openings, said valve further having a valve closure member movable against said housing and means for moving said valve means against said housing for blocking flow through said interior opening, said valve closure member having a stem projecting into said chamber;

pressurized gas conduit means for supplying gas adjacent said housing;

alignment means movable relative to said housing and secured to said conduit means for locating said conduit means relative to said housing and in alignment with said chamber, said alignment means spaced from portions of said conduit means whereby ambient air can freely flow past exterior portions of said conduit means to said chamber;

prong means for engaging said stem for opening said valve closure means; and orifice means associated with said conduit means for discharging at least one jet of pressurized gas through at least one orifice, the sum of the cross-sectional flow areas of all such orifices being not greater than the cross-sectional area of said chamber exterior opening, said orifice means positioned on said conduit means in sapced relation from the walls of the chamber when said conduit means is aligned with said chamber whereby at least one jet of pressurized gas is directed into said chamber to aspirate ambient air from between said orifice means and said chamber through the chamber into said bag.

* * * * *